(12) United States Patent
Lin et al.

(10) Patent No.: US 9,927,883 B1
(45) Date of Patent: Mar. 27, 2018

(54) MOUSE RESOLUTION ESTIMATION

(71) Applicant: GOOGLE INC., Mountain View, CA (US)

(72) Inventors: Tai-hsu Lin, Taipei (TW); Andrew de los Reyes, Belmont, CA (US)

(73) Assignee: GOOGLE LLC, Mountain View, CA (US)

(*) Notice: Subject to any disclaimer, the term of this patent is extended or adjusted under 35 U.S.C. 154(b) by 101 days.

(21) Appl. No.: 14/594,543

(22) Filed: Jan. 12, 2015

(51) Int. Cl.
*G06F 3/0354* (2013.01)

(52) U.S. Cl.
CPC .................. *G06F 3/03543* (2013.01)

(58) Field of Classification Search
CPC .................................................. G06F 3/03543
USPC .................................................. 345/156–184
See application file for complete search history.

(56) References Cited

U.S. PATENT DOCUMENTS

| | | | |
|---|---|---|---|
| 5,721,842 A | * | 2/1998 | Beasley ............... G06F 3/023 345/4 |
| 2015/0301630 A1 | * | 10/2015 | Lee ................. G06F 3/03543 345/163 |

* cited by examiner

*Primary Examiner* — Dennis Joseph
(74) *Attorney, Agent, or Firm* — Brake Hughes Bellermann LLP (57) ABSTRACT

A computer-implemented method for estimating mouse resolution includes receiving a mouse movement event for a mouse at an operating system of a computing device. In response to receiving the mouse movement event, an average speed of the mouse movement event is measured. Multiple average speed measurements for the mouse are aggregated based on multiple mouse movement events. The aggregated average speed measurements for the mouse are reported to a server. An estimated resolution for the mouse is received from the server based on the aggregated average speed measurements for the mouse.

14 Claims, 5 Drawing Sheets

MOUSE RESOLUTION ESTIMATION

TECHNICAL FIELD

This description relates to mouse resolution estimation.

BACKGROUND

Mouse resolution for a computer mouse is measured in terms of counts per inch (CPI), which is also known interchangeably as dots per inch (DPI). CPI or DPI is a number of steps the mouse reports to the operating system (OS) when the mouse moves by one inch. This value varies from mouse to mouse within a great range, for example, from about 200 DPI to larger than 10000 DPI. To correctly map the mouse movement steps to the cursor movement on the screen, the OS uses the mouse DPI. However, the mouse does not report its DPI to the OS.

Instead, the OS may use a default mouse DPI or the OS may use an exhaustive DPI look-up table. In the first instance when the OS uses a default mouse DPI, the user is required to adjust the mouse speed setting if the user is not satisfied with the mouse performance, which may lead to an inferior user experience. In the second instance, developers (e.g., OS developers) may need to manually measure each different type of mouse to determine the DPI for the mouse to build the look-up table.

SUMMARY

According to one general aspect, a computer-implemented method for estimating mouse resolution includes receiving a mouse movement event for a mouse at an operating system of a computing device. In response to receiving the mouse movement event, an average speed of the mouse movement event is measured. Multiple average speed measurements for the mouse are aggregated based on multiple mouse movement events. The aggregated average speed measurements for the mouse are reported to a server. An estimated resolution for the mouse is received from the server based on the aggregated average speed measurements for the mouse.

In another general aspect, a computer-implemented method for estimating mouse resolution includes receiving, at a server, aggregated average speed measurements for a mouse from a computing device, calculating an estimated resolution for the mouse based on the aggregated average speed measurements for the mouse and sending the estimated resolution for the mouse from the server to the computing device.

In another general aspect, a computer-implemented method for estimating mouse resolution includes receiving, at a server, aggregated average speed measurements for multiple types of mouses from multiple different computing devices, calculating estimated resolutions for the types of mouses based on the aggregated average speed measurements received for the types of mouses from the different computing devices and sending the estimated resolutions for the types of mouses from the server to the different computing devices.

In another general aspect, a computing device includes a memory configured to store instructions and a processor operably coupled to the memory, where the processor is configured to execute the instructions that, when executed, cause the processor to receive a mouse movement event for a mouse, in response to receiving the mouse movement event, measure an average speed of the mouse movement event, aggregate multiple average speed measurements for the mouse based on multiple mouse movement events, report the aggregated average speed measurements for the mouse to a server and receive an estimated resolution for the mouse from the server based on the aggregated average speed measurements for the mouse.

In another general aspect, a computing device includes a memory configured to store instructions and a processor operably coupled to the memory, where the processor is configured to execute the instructions that, when executed, cause the processor to receive, at the computing device, aggregated average speed measurements for multiple types of mouses from multiple different computing devices, calculate estimated resolutions for the types of mouses based on the aggregated average speed measurements received for the types of mouses from the different computing devices and send the estimated resolutions for the types of mouses from the computing device to the different computing devices.

The details of one or more implementations are set forth in the accompanying drawings and the description below. Other features will be apparent from the description and drawings, and from the claims.

DETAILED DESCRIPTION

Figure 1:
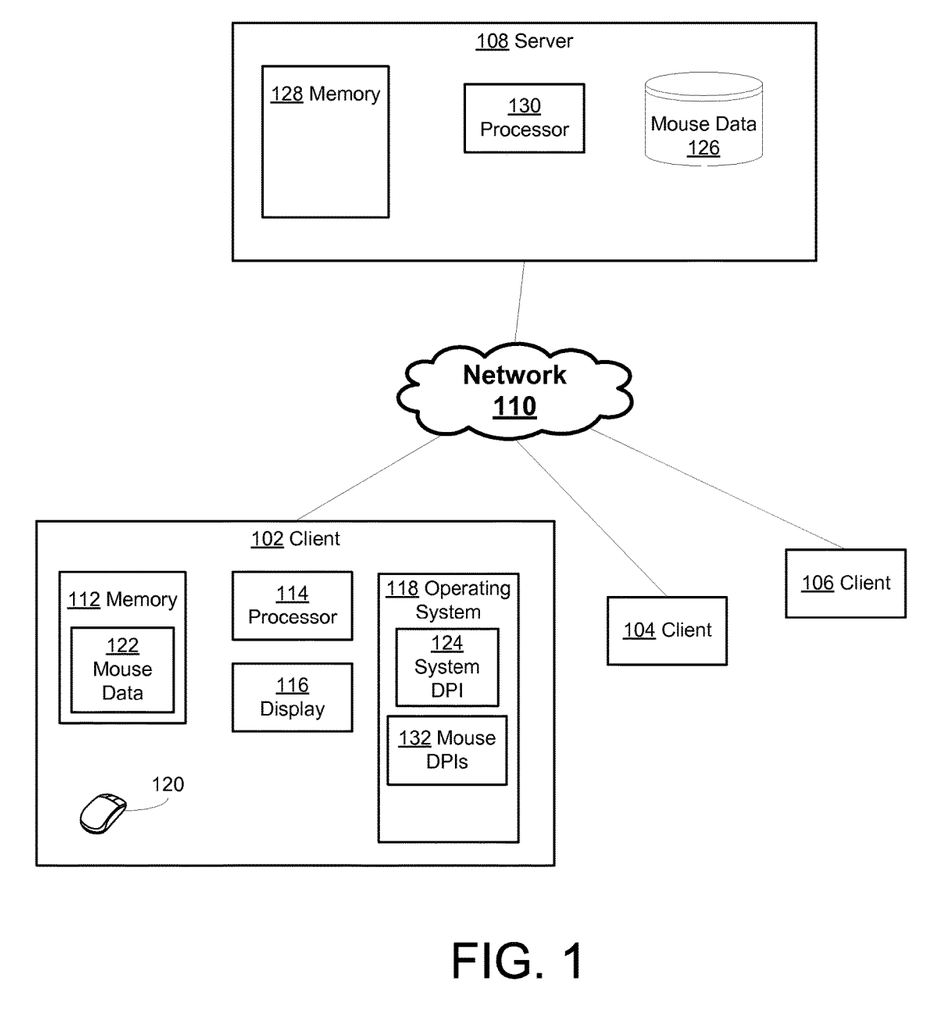
FIG. 1 is a block diagram of a system for mouse resolution estimation.

FIG. 1 is a block diagram of a system for mouse resolution estimation. The system of FIG. 1 includes multiple client computing devices 102, 104 and 106 (also referred to interchangeably as computing devices or client devices) and a server computing device 108 (also referred to as a server). Each of the computing devices 102, 104 and 106 may be the same or a different type of computing device. For example, the client devices 102, 104 and 106 may be laptop computing devices, tablet computing devices, desktop computing devices, netbook computing devices or any other type of computing device. While only three client devices are illustrated in FIG. 1, it is understood that the number of client devices as part of this system may be many millions of client devices, for example.

The server 108 may include any type of computing device that is capable of functioning as described herein. The server 108 and the client devices 102, 104 and 106 may send and receive data and information, including software updates, through the network 110. The network 110 may include a wired and/or wireless network including a wide area network (WAN) such as the Internet.

The system of FIG. 1 is capable of automatically estimating (i.e., not manually estimating) the mouse resolution for different types of mouse devices (also referred to interchangeably as mouses) used by the different client devices 102, 104 and 106. In general, each of the client devices 102, 104 and 106 may use a mouse as a peripheral device to control cursor (or pointer) movement on a display of the client device. An accurate estimation of the mouse resolution for all different types of mouses will lead to better performance and control of the cursor movement on a display of the client devices. Better performance and responsiveness of the mouse because an accurate mouse resolution is used by the client device may result in a more positive user experience with both the mouse and the computing device.

Reference is made to client device 102 with the understanding that client devices 104 and 106 also may include the same or similar components, where the components may be from different manufacturers with different technical specifications. For instance, each client device may include a memory and a processor, where the memory and the processor may be from different manufacturers with different technical specifications. Similarly, each client device may connect with and use different types of peripheral devices including different types of mouse devices. The different types of mouse devices may include different technical specifications, including different mouse resolutions.

Client device 102 includes a memory 112, a processor 114, a display 116 and an operating system 118. A mouse 120 may be paired with the client device 102 and used to control cursor movement and other functionality on the display 116. The mouse 120 may be paired with the client device 102 either wired or wirelessly. As part of the pairing process, the operating system 118 may identify the mouse 120 as a particular type or manufacturer of mouse and the appropriate driver software for that mouse 120 may be used by the operating system 118 to interact with the mouse 120.

As discussed above, the mouse 120 does not report its resolution to the client device 102. To determine the resolution of the mouse 120, the client device 102 collects mouse movement events from the mouse 120 and measures an average speed of the mouse movement events. The client device 102 aggregates the average speed measurements for the mouse 120 and reports the aggregated average speed measurements to the server 108 through the network 110. The server 108 receives the average speed measurements for the mouse 120 from the client device 102. The server 108 also receives average speed measurements from other client devices (e.g., client devices 104 and 106) using the same type of mouse. That is, the server 108 collects information from many client devices using many different types of mouse devices.

In one example implementation, the client device 102 may use a single mouse 120 and report its information to the server 108. In other examples, the client device 102 may be paired with more than one mouse and may report the average speed of the mouse movement events along with information (e.g., product ID and/or vendor ID) identifying each mouse to the server 108. The server 108 will collect the information for both devices from the client device 102.

The server 108 calculates an estimated resolution for the mouse 120 based on the aggregated average speed measurements for the mouse 120. The server 108 may calculate the estimated resolution for the mouse 120 based not only on the aggregated average speed measurements received from the client device 102 but also based on the aggregated average speed measurements received from other client devices using the same mouse type.

The server 108 sends the estimated resolution to the client device 102 and the client device 102 stores the estimated mouse resolution. The server 108 may send the estimated mouse resolution in the form of a table of mouse resolutions that includes estimated mouse resolutions for many different types of mouse devices that have been automatically calculated by the server 108 using collected average speed measurements from client devices using the many different types of mouse devices. Then, the client device 102 correlates the movement of a pointer on the display 116 using the received estimated resolution for the mouse 120.

The client device 102 receives mouse movement events and measure the average speed of the mouse movement event. For example, when the mouse 120 is moved, the mouse 120 reports the movements to the operating system 118 in terms of units moved. The operating system 118 receives the mouse movement events for the mouse 120. The average speed of the mouse 120 may be measured by summing the distance moved divided by the time it took to move that distance. The operating system 118 may determine the distance the mouse 120 moved based on a number of units moved by the mouse 120 as reported by the mouse 120.

In one implementation, the operating system 118 may break (or divide) the mouse movement events into one or more sessions. For instance, the mouse movement event (or mouse movement sequence) may be divided into a new session whenever the time between an incoming mouse movement event and the last event is larger than a threshold. The sessions may include a defined period of time or the sessions may have different periods of time. The processor 114 measures the average speed of the mouse 120 by dividing the distance moved during the session by the period of time for the session. In one example, the distance moved during the session may be the L2 distance moved by the mouse 120 as reported to the operating system 118.

The processor 114 aggregates the average speed measurements from multiple sessions and stores the average speed measurements for later reporting to the server 108. In one implementation, the memory 112 may include a mouse data module 122. The mouse data module 122 may be used to store the average speed measurements for the mouse 120. The mouse data module 122 may store the speed measurements in any number of different formats.

The mouse data module 122 also may store other information related to the mouse 120 including information identifying the particular mouse type. The identifying information may include a vendor identifier and/or model identifier for the mouse 120. In this manner, the average speed measurements and the mouse identifying information may be sent to the server 108 such that the server 108 can group the average speed measurements and calculate the estimated resolution for each specific mouse type being reported by the many client devices.

In one implementation, the mouse data module 122 may store the average speed measurements using one or more histograms. For instance, one histogram may be used to store the average speed measurements and the histogram may be periodically communicated to the server 108. The mouse data module 122 also may use other histograms including a sparse histogram for the mouse USB vendor ID and a sparse histogram for the mouse USB product ID.

In one implementation, the operating system 118 may employ one or more pointer ballistics (also referred to as pointer acceleration curves). The pointer acceleration curves may be a user-selectable setting that determines the speed of the pointer movement on the display in relation to a mouse movement event. The operating system may measure the average speed of the mouse and track the average speed for the currently selected acceleration curve. The mouse data module 122 may associate the measured average speeds with a particular acceleration curve that was selected at the time of the mouse event. A separate histogram of average speed measurements may be used for each different acceleration curve.

The processor 114 may report the mouse data from the mouse data module 122 to the server 108. As discussed above, the mouse data 122 may include information that identifies the particular mouse type and model and the average speed measurements. The average speed measurements may include measurements that are associated with a specific acceleration curve. If the mouse data is stored using histograms, then the histograms may be communicated to the server 108.

The operating system 118 also may include other information such as a system DPI 124. The system DPI 124 may be a default value that is coded as part of the operating system. Different operating systems may have different default system DPI values. The system DPI 124 is the value for the conversion in the number of mouse units moved as reported by the mouse to the operating system 118 to correlate the number of units that the operating system moves the pointer on the display 116. The system DPI 124 is a conversion number. The units that the operating system moves the pointer on the display 116 may be in terms of the number of pixels moved. Other units also may be used instead of pixels.

Even though the operating system includes a default system DPI, each mouse type may have a different resolution referred to as mouse DPI. The operating system 118 knows the number of units that a mouse has moved, which can be used to measure the average speed, but does not know the actual distance moved because each mouse may have a different resolution and the mouse does not report its resolution to the operating system 118.

Once the client 102 measures and collects the average speed measurements as part of the mouse data 122, the client 102 reports the mouse data 122, including the average speed measurements to the server 108. The client 102 may periodically report the mouse data 122 to the server 108 and/or the server 108 may poll or request the mouse data 122 from the client 102. The server 108 stores the received mouse data 122 in a mouse data database 126 on the server 108. The server 108 also includes a memory 128 and a processor 130. The memory 128 stores instructions and the processor 130 is configured to execute the instructions stored on the memory 128.

The server 108 uses the aggregated average speed measurements for the mouse 120 to calculate an estimated resolution for the mouse 120. In one example, implementation, the server 108 uses the average speed measurements for the mouse 120 only from the client 102. In other examples, the server 108 uses the average speed measurements for the mouse 120 from the client 102 and average speed measurements from other clients (e.g., clients 104 and 106) using the same mouse model.

The server 108, using the processor 130 and the memory 128, may calculate the mouse resolution using the following DPI estimation equation:

$$AvgSpeed=DPI_{mouse}*(A*DPI_{system}+B)$$

where the AvgSpeed is the average speed measurements being provided by the client devices, the $DPI_{system}$ is a particular operating system default mouse resolution coded into the operating system and A and B are constants that do not vary from mouse to mouse. The equation may be solved for the $DPI_{mouse}$ for each different mouse model that has average speed measurements reported from different client devices.

The DPI estimation problem may be formulated as a nonlinear least square instance with the expression. That is, for N different mice, which have unknown DPIs, there are N observations (i.e., measured average speeds) and N unknowns (i.e., mouse DPIs) plus 2 unknown constants, A and B. A few manually measured mouse DPIs also may be plugged into the equation, making the whole system overdetermined. A nonlinear least square fitting may be used to solve the equation for the estimated mouse resolutions for the different mouse models.

The results may be stored in a table in the mouse data 126 and the results may be communicated to the client device 102. In one implementation, the table is communicated to the client device 102 and the table is stored as part of the operating system 118 as the mouse DPIs 132. Then, when the mouse 120 is used, the operating system 118 knows the estimated resolution for the mouse 120 and may use the known estimated resolution to correlate the movements of the mouse 120 with a pointer or cursor on the display 116. The estimated resolution stored in the mouse DPIs 132 effectively replaces and may be used instead of the system DPI that is coded into the operating system 118.

Figure 2:
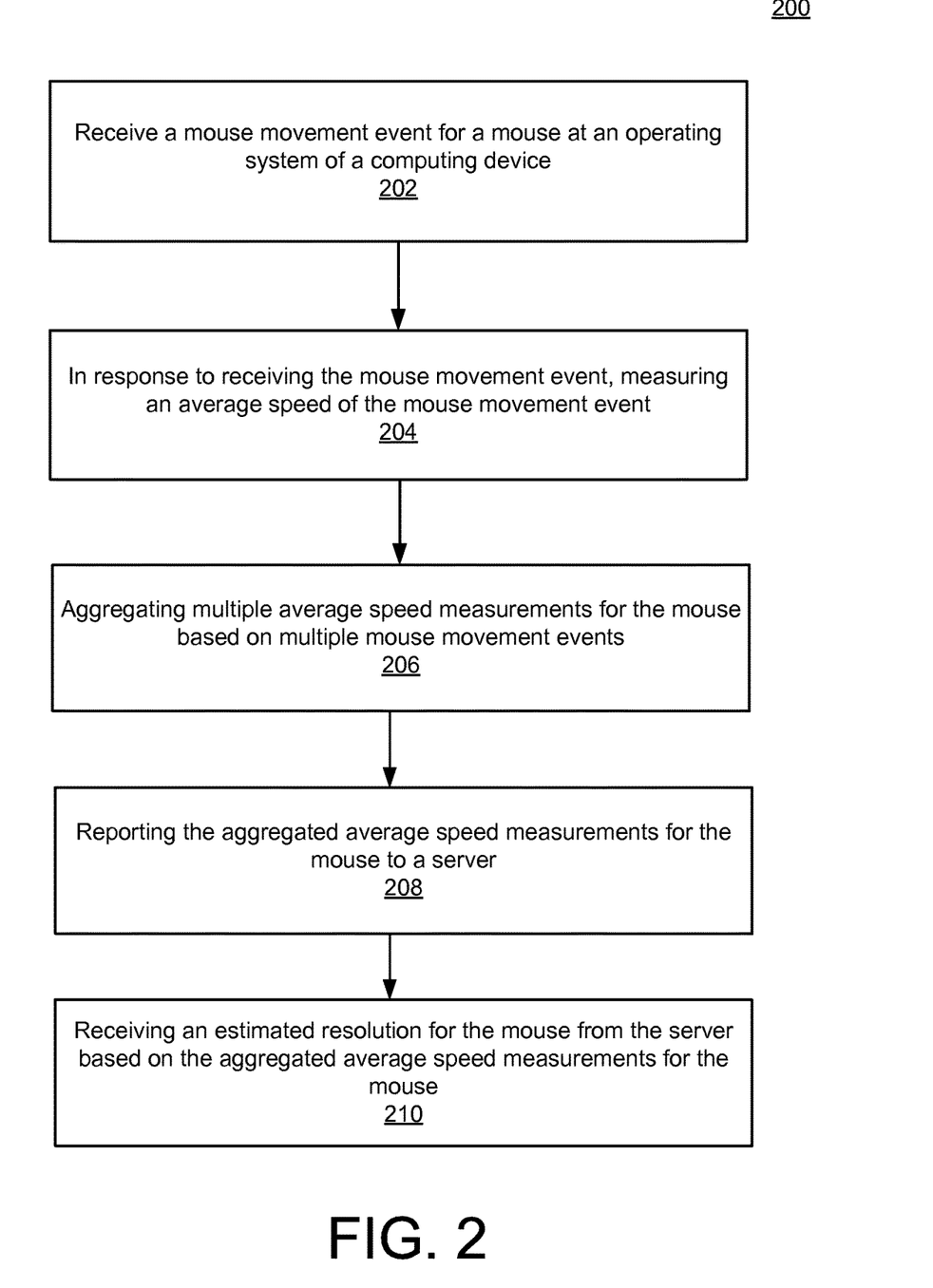
FIG. 2 is a flowchart illustrating example operations of the system of FIG. 1 from a perspective of a client device.

Referring to FIG. 2, an example process 200 illustrates example operations of the system of FIG. 1 from a perspective of a client device. Process 200 includes receiving a mouse movement event for a mouse at an operating system of a computing device (202). For example, the operating system 118 in client computing device 102 receives a mouse movement event for the mouse 120. The mouse movement event occurs when a user moves the mouse 120 any distance. The mouse 120 reports its movements to the operating system 118 so that the operating system 118 in cooperation with the processor 114 may cause corresponding movement of a pointer or cursor on the display 116.

Process 200 includes measuring an average speed of the mouse movement event in response to receiving the mouse movement event (204). For example, the processor 114 measures the average speed of the mouse movement event in response to receiving the mouse movement event. The mouse 120 may report a number of units moved to the operating system 118 and the processor may measure the average speed of the mouse movement in terms of the number of units moved as reported by the mouse. The average speed may be measured by dividing the number of units by a length of time of the mouse movement.

In one example implementation, the process further includes dividing the mouse movement event into multiple sessions and measuring the average speed of the mouse movement event includes measuring the average speed of each of the multiple sessions. The distance moved during each of the sessions in terms of units moved as reported by the mouse 120 is divided by a length of time for each session to obtain the average speed of the mouse movement during a session. In some instances, the sessions may include a defined period of time.

Process 200 includes aggregating multiple average speed measurements for the mouse based on multiple mouse movement events (206). For example, the processor may store the average speed measurements and aggregate them as part of the mouse data module 122 in the memory 112. The mouse data module 122 may include information such as mouse manufacturer and model and other identifiers along with the average speed measurements. In the situation where the mouse movement events are divided into sessions, the processor 114 may aggregate the average speed measurements for the multiple sessions. In one implementation, as discussed in detail above, the mouse data module 122 may include histograms that are used to store the average speed measurements and other mouse-related data.

Process 200 includes reporting the aggregated average speed measurements for the mouse to a server (208). For example, the processor 114 may report the aggregated average speed measurements for the mouse 120 to the server 108 using the network 110. The processor 114 may cause the mouse data 122 to be periodically reported to the server 108, including the data from histograms, if histograms are used. In one implementation, the mouse data 122 may be the raw data that is collected and measured and reported on a periodic or other basis. That is, the data may not be reported in the format of a histogram.

Process 200 includes receiving an estimated resolution for the mouse from the server based on the aggregated speed measurements for the mouse (210). For example, the client device 102 receives the estimated resolution for the mouse 120 from the server 108 based on the aggregated average speed measurements for the mouse 120. The estimated resolution for the mouse 120 may be received as part of a table of mouse DPIs 132 that is provided to the operating system 118 as part of an update to the operating system 118. In other instances, the client device 102 may receive just the estimated resolution for the mouse 120.

The process also may include correlating movement of a pointer on a display 116 of the computing device 102 using the received estimated resolution for the mouse 120. In this manner, the received estimated resolution enables more accurate movement of the pointer on the display 116 in response to mouse movement events.

In one implementation, the received estimated resolution replaces the system DPI for that particular mouse. The received estimated resolution may be further refined by repeating the process 200 described above, including using the received estimated resolution that was just received. For example, the client device 102 may collect and measure additional aggregated speed measurements for the mouse 120. The additional aggregated speed measurements may be reported to the server 108 along with the estimated mouse resolution and other information. The server 108 may then use both the average speed data gathered with the previous system DPI and the new average speed data gathered with the new estimated resolution when running the non-linear least square method calculations, which would result in a new, more accurate mouse resolution estimation. This process may continue to repeat to refine the mouse resolution estimation.

Alternatively, the process may calculate the estimated mouse resolution as described above and simple send the new average speed data along with the new estimated mouse resolution to the server 108. The server 108 may use just the new average speed data and the new estimated mouse resolution to calculate an updated estimated mouse resolution.

Figure 3:
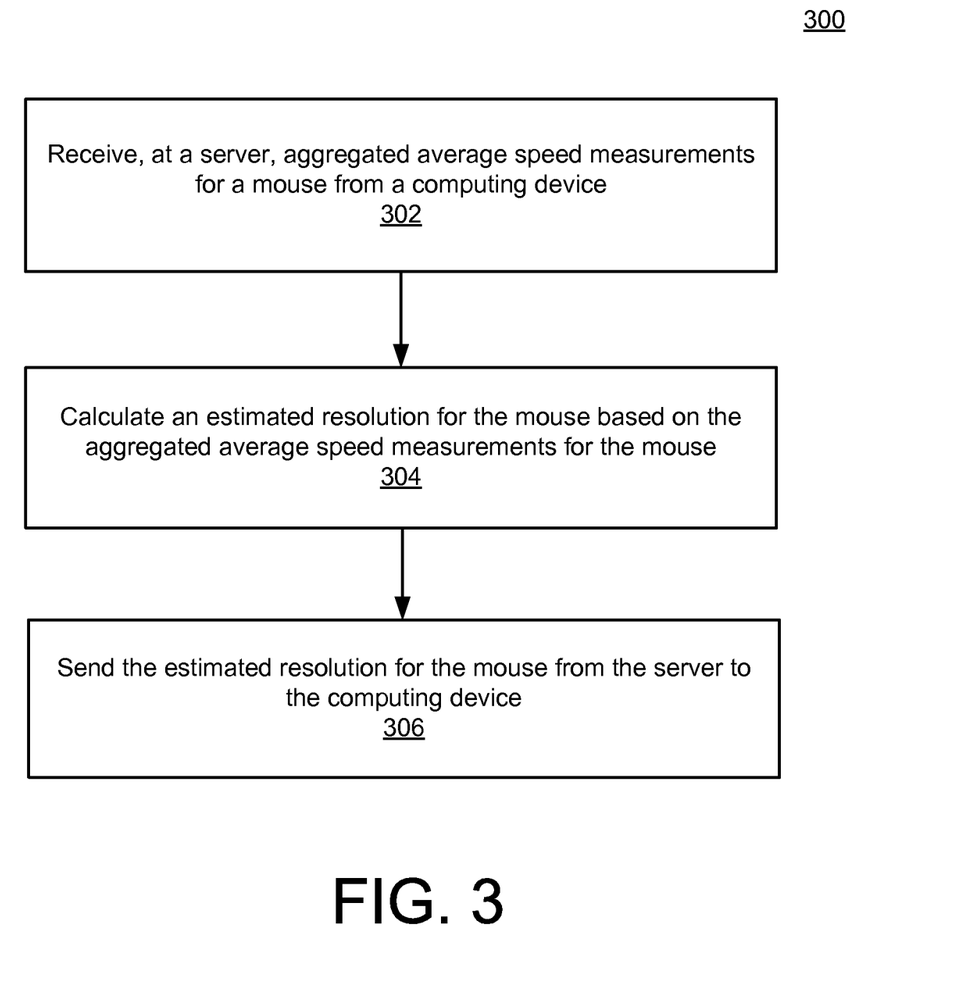
FIG. 3 is a flowchart illustrating example operations of the system of FIG. 1 from a perspective of a server.

Referring to FIG. 3, an example process 300 illustrates example operations of the system of FIG. 1 from a perspective of a server. Process 300 includes receiving, at a server, aggregated average speed measurements for a mouse from a computing device (302). For example, the server 108 receives aggregated average speed measurements for the mouse 120 from the computing device 102. The information received by the server 108 also may include information identifying the particular mouse model and the average speed measurements also may be associated with a particular pointer ballistics or pointer acceleration curve that was selected at the time the mouse movement events occurred and the average speed measurements were determined. The received information is stored on the server 108 as part of the mouse data 126.

Process 300 includes calculating an estimated resolution for the mouse based on the aggregated average speed measurements for the mouse (304). For example, the processor 130 calculates the estimated resolution for the mouse 120 based on the aggregated average speed measurements for the mouse 120. As discussed above, the processor may use the known data reported by the client device 102 and stored in the mouse data 126 and the DPI estimation equation provided above to calculate the estimated resolution for the mouse 120. In one implementation, calculating the estimated resolution for the mouse 120 includes using a nonlinear least square fitting to calculate the estimated resolution for the mouse 120.

Process 300 includes sending the estimated resolution for the mouse from the server to the computing device (306). For example, the server 108 sends the estimated mouse resolution to the computing device 102. As discussed above, the estimated resolution may be in a table of estimated mouse resolutions. The table of estimated resolutions for different mouse types may be created and/or updated with the estimated resolution for the mouse 120. The server 108 may send the table to the computing device 102 for use by the operating system 118. The estimated resolution may be refined by completing one or more iterations of the process 300 in a manner similar to the one described above with respect to process 200.

Figure 4:
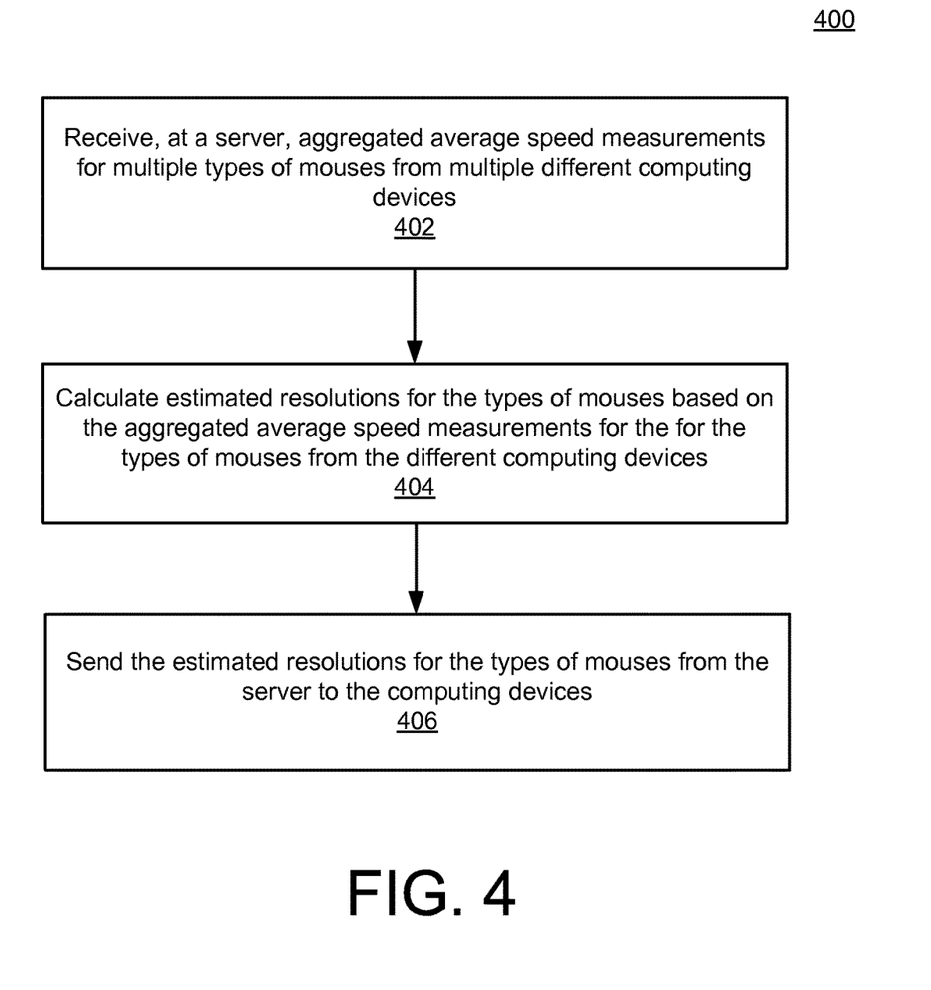
FIG. 4 is a flowchart illustrating example operations of the system of FIG. 1 from a perspective of a server.

Referring to FIG. 4, an example process 400 illustrates example operations of the system of FIG. 1 from a perspective of a server. Process 400 includes receiving, at a server, aggregated average speed measurements for multiple types of mouses from multiple different computing devices (402). For example, the server 108 receives aggregated average speed measurements for multiple types of mouses from different computing devices such as computing devices 102, 104 and 106. In this manner, the server 108 is receiving many thousands or millions of measurements for all different types of mouse models from thousands or millions of computing devices. The information received by the server 108 includes information identifying the particular mouse model and other identifying information along with the speed measurements. The server 108 stores the received information in the mouse data 126.

Process 400 includes calculating estimated resolutions for the types of mouses based on the aggregated average speed measurements received for the types of mouses from the different computing devices (404). For example, the server 108 uses the processor 130 to calculate the estimated resolutions for the types of mouses based on the aggregated average speed measurements stored in the mouse data 126. The processor 130 uses the DPI estimation equation discussed above using a nonlinear least square fitting to calculated the estimated resolutions.

Process 400 includes sending the estimated resolutions for the types of mouses from the server to the computing devices (406). For example, the server 108 sends the estimated resolutions for the types of mouses to the computing devices 102, 104 and 106. Sending the estimated resolution may include creating and/or updating a table of estimated resolutions for the types of mouses with the estimated resolutions for the types of mouses and sending the table from the server 108 to the computing devices 102, 103 and 106.

It is understood that other measured characteristics other than average mouse speed may be used to determine the estimated mouse resolution. For example, a time of the mouse event session or the maximum speed in a session may be used along with appropriate equations.

Figure 5:
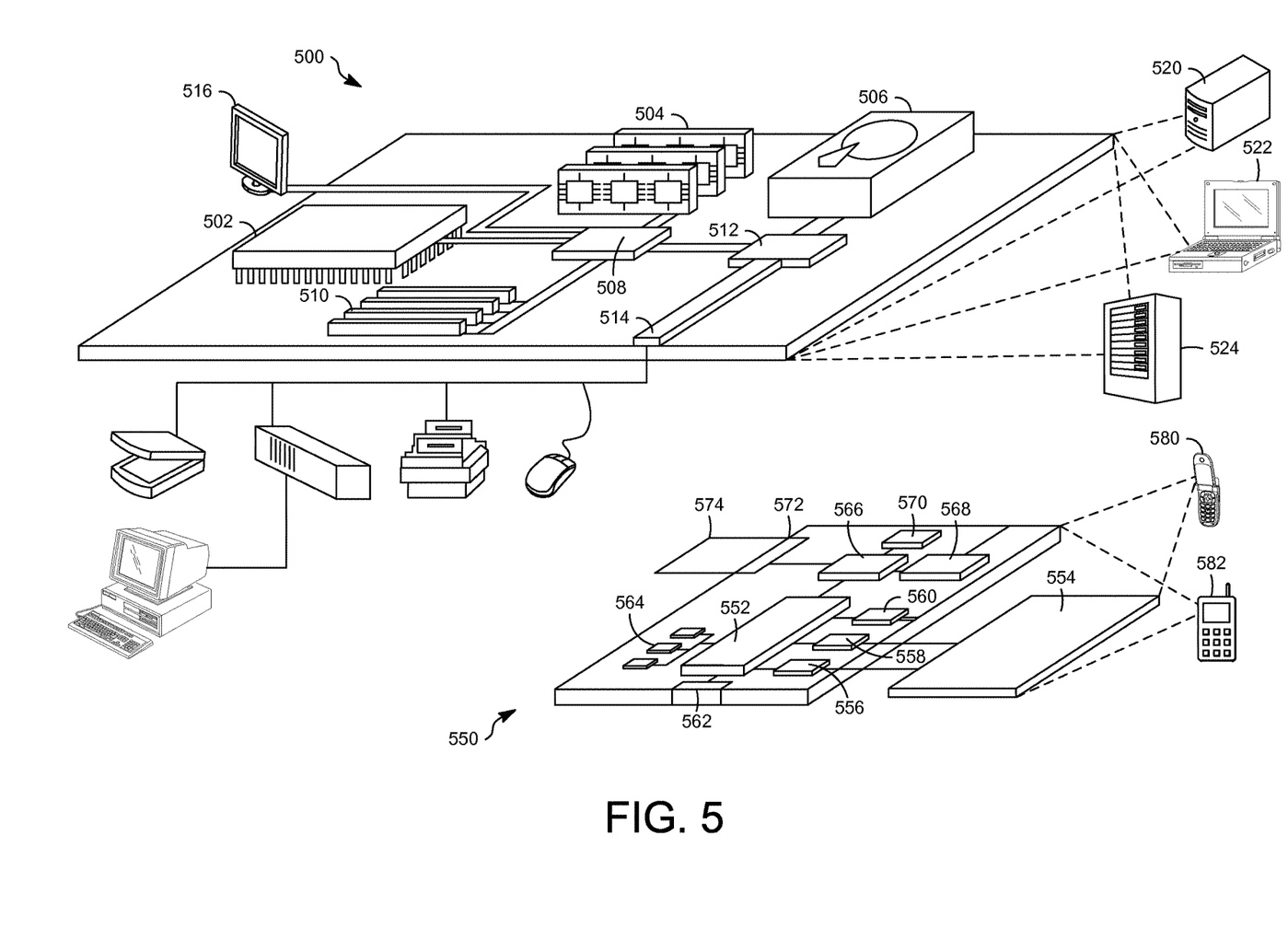
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for estimating mouse resolution, the method comprising:

receiving a mouse movement event based on a number of units moved by a mouse at an operating system of a computing device, the mouse including information identifying a type of mouse and having a default resolution for the type of mouse;

in response to receiving the mouse movement event, measuring an average speed of the mouse movement event;

aggregating multiple average speed measurements for the mouse based on multiple different mouse movement events;

reporting the aggregated average speed measurements for the mouse to a server and reporting the information identifying the type of mouse associated with the aggregated average speed measurements;

receiving, at the computing device, a table of estimated mouse resolutions listing estimated mouse resolutions for multiple different types of mouses including an estimated resolution for the mouse from the server based on the aggregated average speed measurements for the mouse and based on the information identifying the type of mouse;

changing the default resolution for the mouse to the estimated resolution contained in the table of estimated mouse resolutions for the type of mouse; and correlating movement of a pointer on a display of the computing device using the estimated resolution for the mouse.

2. The computer-implemented method of claim 1 further comprising dividing the mouse movement event into multiple sessions, wherein each session includes a defined period of time.

3. The computer-implemented method of claim 2 wherein measuring the average speed of the mouse movement event comprises dividing a distance moved during the session by the period of time for the session.

4. The computer-implemented method of claim 3 wherein aggregating the multiple average speed measurements comprises aggregating the average speed measurements for the multiple sessions.

5. The computer-implemented method of claim 1 wherein reporting the aggregated average speed measurements comprises using multiple histograms to report the aggregated average speed measurements for the mouse to the server.

6. A computer-implemented method for estimating mouse resolution, the method comprising:

receiving, at a server, aggregated average speed measurements for a mouse from a computing device and information identifying a type of mouse, the mouse having a default resolution for the type of mouse, wherein a mouse movement event is based on a number of units moved by the mouse and the aggregated average speed measurements are based on multiple different mouse movement events by the mouse;

calculating an estimated resolution for the mouse based on the aggregated average speed measurements for the mouse using a non-linear least square fitting;

updating a table of estimated mouse resolutions listing estimated mouse resolutions for different types of mouses with the estimated resolution for the mouse; and sending the table of estimated mouse resolutions including the estimated resolution for the mouse from the server to the computing device for the computing device to update the default mouse resolution with the estimated mouse resolution.

7. The computer-implemented method of claim 6 further comprising accounting for pointer acceleration curves in the calculation for the estimated resolution for the mouse.

8. A computer-implemented method for estimating mouse resolution, the method comprising:

receiving, at a server, aggregated average speed measurements for multiple types of mouses from multiple different computing devices including identifying information for each type of different mouse, wherein each type of mouse includes a default resolution, wherein a mouse movement event is based on a number of units moved by the mouse and the aggregated average speed measurements are based on multiple different mouse movement events by the multiple types of mouses;

calculating estimated resolutions for the types of mouses based on the aggregated average speed measurements received for the types of mouses from the different computing devices using a non-linear least square fitting;

updating a table of estimated mouse resolutions listing estimated mouse resolutions for different types of mouses with the estimated resolution for types of mouses; and sending the table having the estimated resolutions for the types of mouses from the server to the different computing devices for the computing devices to update the default mouse resolutions with the estimated mouse resolutions.

9. A computing device, comprising:

a memory configured to store instructions; and a processor operably coupled to the memory, wherein the processor is configured to execute the instructions that, when executed, cause the processor to:

receive a mouse movement event based on a number of units moved by a mouse, the mouse including information identifying a type of the mouse and having a default resolution for the type of mouse;

in response to receiving the mouse movement event, measure an average speed of the mouse movement event;

aggregate multiple average speed measurements for the mouse based on multiple different mouse movement events;

report the aggregated average speed measurements for the mouse to a server and report the information identifying the type of mouse associated with the aggregated average speed measurements;

receive, at the computing device, a table of estimated mouse resolutions listing estimated mouse resolutions for multiple different types of mouses including an estimated resolution for the mouse from the server based on the aggregated average speed measurements for the mouse and based on the information identifying the type of mouse;

change the default resolution for the mouse to the estimated resolution contained in the table of estimated mouse resolutions for the type of mouse; and correlate movement of a pointer on a display of the computing device using the estimated resolution for the mouse.

10. The computing device of claim 9 wherein the processor is further configured to execute the instructions that, when executed, cause the processor to divide the mouse movement event into multiple sessions, wherein each session includes a defined period of time.

11. The computing device of claim 10 wherein the instructions that, when executed, cause the processor to measure the average speed of the mouse movement event comprise instructions that, when executed, cause the processor to divide a distance moved during the session by the period of time for the session.

12. The computing device of claim 11 wherein the instructions that, when executed, cause the processor to aggregate the multiple average speed measurements comprise instructions that, when executed, cause the processor to aggregate the average speed measurements for the multiple sessions.

13. The computing device of claim 9 wherein the instructions that, when executed, cause the processor to report the aggregated average speed measurements comprise instructions that, when executed, cause the processor to use multiple histograms to report the aggregated average speed measurements for the mouse to the server.

14. A computing device, comprising:
   a memory configured to store instructions; and
   a processor operably coupled to the memory, wherein the processor is configured to execute the instructions that, when executed, cause the processor to:
      receive, at the computing device, aggregated average speed measurements for multiple types of mouses from multiple different computing devices including identifying information for each type of different mouse, wherein each type of mouse includes a default resolution, wherein a mouse movement event is based on a number of units moved by the mouse and the aggregated average speed measurements are based on multiple different mouse movement events by the multiple types of mouses;
      calculate estimated resolutions for the types of mouses based on the aggregated average speed measurements received for the types of mouses from the different computing devices using a non-linear least square fitting; and
      send the table having the estimated resolutions for the types of mouses from the computing device to the different computing devices for the computing devices to update the default mouse resolutions with the estimated mouse resolutions.

* * * * *